(12) United States Patent
Yu et al.

(10) Patent No.: US 10,551,657 B2
(45) Date of Patent: Feb. 4, 2020

(54) TOUCH PANEL AND METHOD OF MANUFACTURING THE SAME

(71) Applicant: TPK Touch Solutions (Xiamen) Inc., Xiamen (CN)

(72) Inventors: Jing Yu, Xiamen (CN); Huilin Ye, Zhangzhou (CN); Tsung-Ke Chiu, Tainan (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 331 days.

(21) Appl. No.: 15/496,533

(22) Filed: Apr. 25, 2017

(65) Prior Publication Data

US 2017/0285782 A1    Oct. 5, 2017

Related U.S. Application Data

(62) Division of application No. 13/945,885, filed on Jul. 18, 2013, now Pat. No. 9,638,948.

(30) Foreign Application Priority Data

Jul. 24, 2012   (CN) .......................... 2012 1 0256784

(51) Int. Cl.
G06F 3/041   (2006.01)
G02F 1/1333   (2006.01)

(52) U.S. Cl.
CPC .......... *G02F 1/13338* (2013.01); *G06F 3/041* (2013.01); *G06F 2203/04103* (2013.01); *Y10T 428/24793* (2015.01); *Y10T 428/24851* (2015.01); *Y10T 428/24868* (2015.01)

(58) Field of Classification Search
CPC ..... Y10T 428/24802; Y10T 428/24851; Y10T 428/24868; Y10T 428/24793; G06F 3/041; G06F 2203/04103
See application file for complete search history.

(56) References Cited

U.S. PATENT DOCUMENTS

2009/0257010 A1* 10/2009 Sakurai ............. G02F 1/133308 349/110
2013/0100039 A1* 4/2013 Hong ................. B32B 37/1207 345/173

* cited by examiner

*Primary Examiner* — Gerard Higgins
(74) *Attorney, Agent, or Firm* — Cooper Legal Group, LLC (57) ABSTRACT

A touch panel having a central region and a peripheral region, including: a substrate; a touch sensing layer disposed on the substrate; a wiring layer disposed on the peripheral region of the substrate electrically connected to the touch sensing layer; a first decorative layer disposed on the peripheral region and covering the wiring layer; a transparent adhesive layer disposed on the touch sensing layer and the first decorative layer; a cover substrate disposed on the transparent adhesive layer; and a second decorative layer disposed between the cover substrate and the transparent adhesive layer, and corresponding to the peripheral region.

20 Claims, 7 Drawing Sheets

TOUCH PANEL AND METHOD OF MANUFACTURING THE SAME

This application is a divisional of and claims priority to U.S. patent application Ser. No. 13/945,885, titled "TOUCH PANEL AND METHOD OF MANUFACTURING THE SAME" and filed on Jul. 18, 2013, which claims priority to China Patent Application No. 201210256784.5, filed on Jul. 24, 2012. The entirety of U.S. patent application Ser. No. 13/945885 and China Patent Application No. 201210256784.5 are incorporated herein by reference.

BACKGROUND OF THE INVENTION

Field of the Invention

The present disclosure relates to touch technology, and in particular relates to a touch panel and method of manufacturing the same.

Description of the Related Art

The function of touch panels is to allow users to input by using fingers or a stylus. In general, a touch panel can be classified into resistive, capacitive, surface acoustic wave (SAW), and optical touch panels according to their methods of sensing.

The surface of a touch panel can be generally sorted into two sections, which are a non-visible region and visible region respectively. Generally, the non-visible region surrounds the visible regions and forms an opaque frame to cover up the visibility of the components, such as wires corresponding to the non-visible region. The visible region is the section where the users touch and operate the device.

Figure 1A:
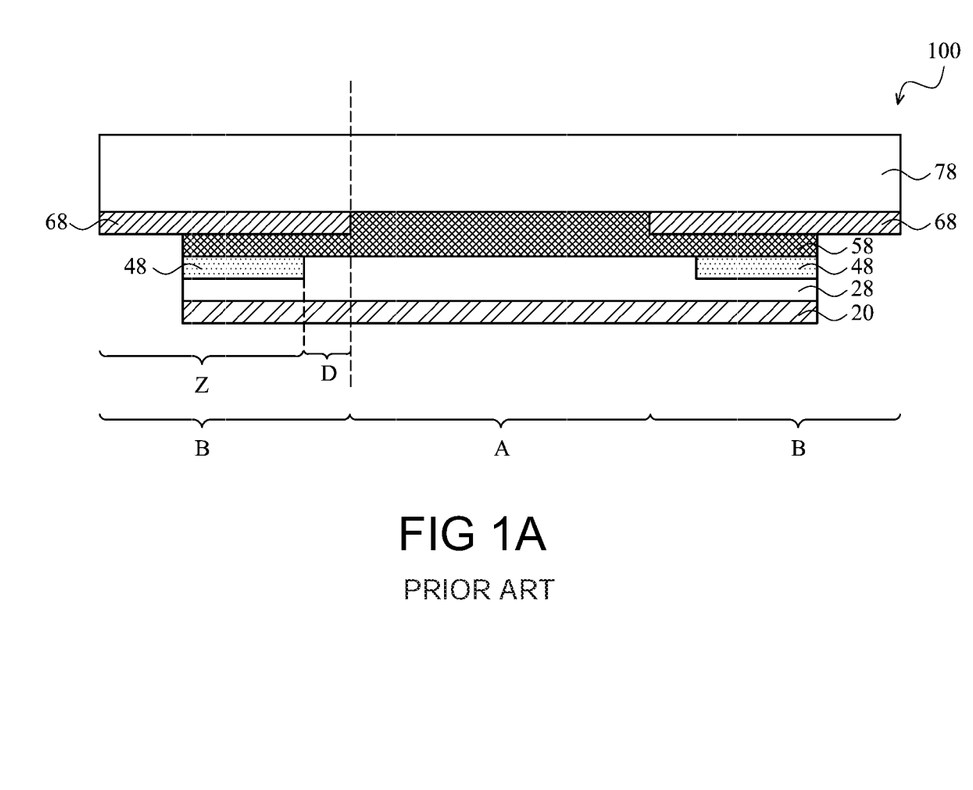
FIG. 1A illustrates the cross-sectional view of a conventional touch panel.
Figure 1B:
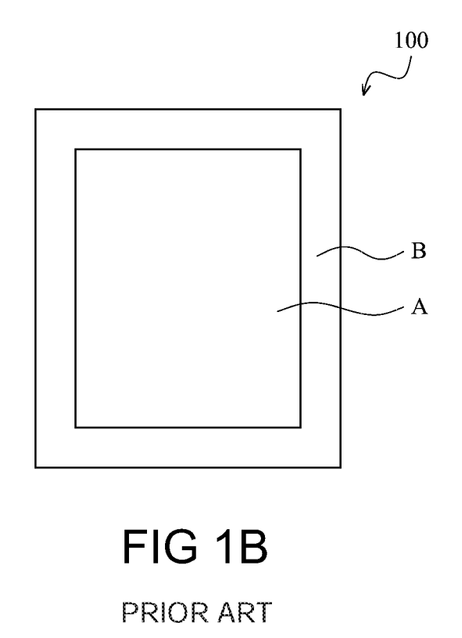
FIG. 1B illustrates the top view of a conventional touch panel.

FIG. 1A illustrates the cross-sectional view of a conventional touch panel. For simplicity, only a portion of components is illustrated in FIG. 1A. Referring to FIG. 1A, a touch panel 100 comprises a substrate 21, a touch sensing layer 28, a wiring layer 48, a transparent adhesive layer 58, a cover substrate 78, and a decorative layer 68 at the peripheral of the cover substrate 78. The wiring layer 48 is formed at the peripheral of the substrate 20 and is electrically connected to the touch sensing layer 28. FIG. 1B illustrates the top view of the conventional touch panel 100. As shown in FIG. 1A and FIG. 1B, the touch panel 100 has a visible region A and a non-visible region B surrounding the visible region A, wherein the range of the non-visible region is defined by the decorative layer 68, and the decorative layer 68 is used to cover the wiring layer 48. To prevent the wiring layer 48, underneath the decorative layer 68 in the non-visible region, from being seen by users at an inclined angle from the top of the touch panel 100, the decorative layer 68 is extended to a distance D. The distance from outer edge of the cover substrate 78 to inner edge of the wiring layer 48 is Z. Thus, the width of the decorative layer 68 of the touch panel 100 is generally designed to be the sum of the distances Z and D. In other words, the width of the opaque frame is the sum of D and Z. Therefore, it is worth studying how to avoid the wiring layer being visible while letting the width of the frame (or decorative layer) be reduced.

SUMMARY OF THE INVENTION

The present invention provides a touch panel having a central region and a peripheral region, including: a substrate; a touch sensing layer disposed on the substrate; a wiring layer, disposed on the peripheral region of the substrate, electrically connected to the touch sensing layer; a first decorative layer disposed on the peripheral region of the substrate and covering the wiring layer; a transparent adhesive layer disposed on the first decorative layer; a cover substrate disposed on the transparent adhesive layer; and a second decorative layer disposed between the cover substrate and the transparent adhesive layer, and corresponding to the peripheral region.

In an embodiment, the transparent adhesive layer is disposed on the touch sensing layer.

The present invention also provides a method of manufacturing a touch panel having a central region and a peripheral region, comprising the steps of: providing a substrate; forming a touch sensing layer on the substrate; forming a wiring layer on the peripheral region of the substrate, electrically connected to the touch sensing layer; forming a first decorative layer on the peripheral region, covering the wiring layer; and attaching a cover substrate to the first decorative layer by a transparent adhesive layer, wherein a second decorative layer is formed between the cover substrate and the transparent adhesive layer, and corresponds to the peripheral region.

In an embodiment, the first decorative layer and the second decorative layer are both formed by a printing process.

By using the techniques of the present invention, it can prevent the wiring layer from being seen by users at an inclined angle from the top of the touch panel. Furthermore, the frame width of the touch panel can be reduced.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is the best-contemplated mode of carrying out the invention. This description is made for the purpose of illustrating the general principles of the invention and should not be taken in a limiting sense. The scope of the invention is best determined by reference to the appended claims. In addition, there will now be described an embodiment of this invention with reference to the accompanying drawings. In the drawings, the shape and thickness of one embodiment may be exaggerated for clarity and convenience. This description will be directed in particular to elements forming part of or cooperating more directly with, apparatus in accordance with the present invention. It is to be understood that elements not specifically shown or described may take various form well known to those skilled in the art. Further, when a layer is referred to as being on another layer or "on" a substrate, it may be directly on the other layer or substrate, or intervening layers may also be present.

Figure 2:
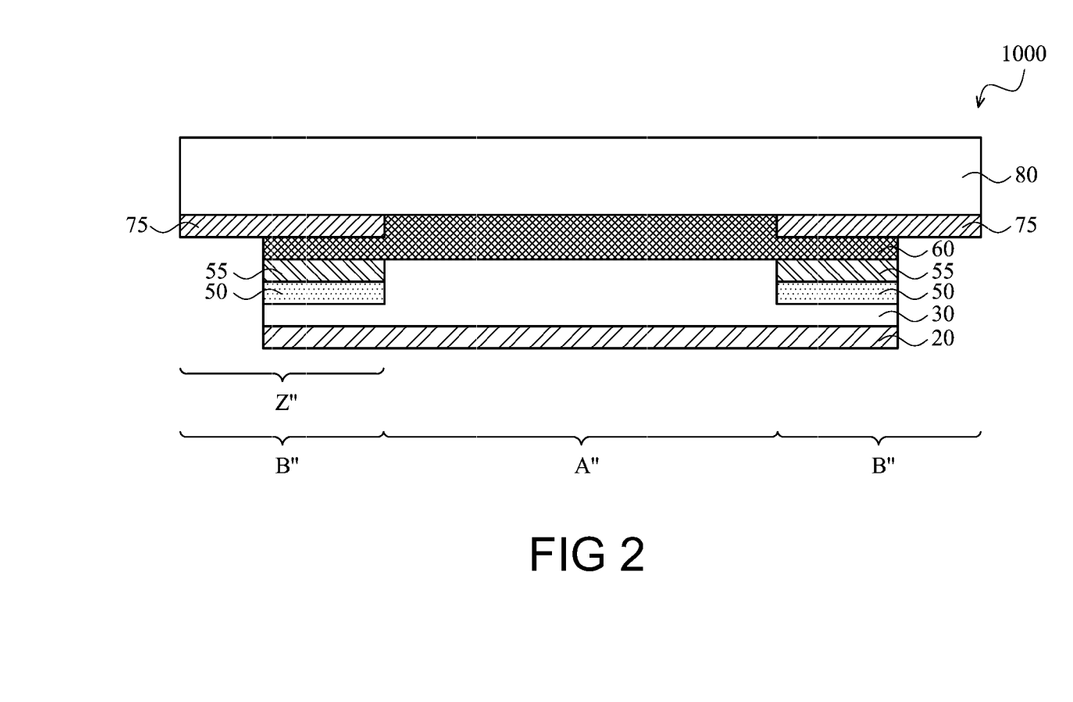
FIG. 2 illustrates the cross-sectional view of a touch panel in accordance with an embodiment of the present disclosure.

FIG. 2 illustrates the cross-sectional view of a touch panel 1000 in accordance with an embodiment. For simplicity, FIG. 2 illustrates only some of the components of the touch panel 1000 that are directly related to the embodiments of the present disclosure. Referring to FIG. 2, a touch panel 1000 has a central region A" and a peripheral region B" surrounding the central region A", and the touch panel includes a substrate 20, a touch sensing layer 30 extending from the central region A" to the peripheral region B". In an embodiment, the touch sensing layer 30 is only disposed in the central region A". A wiring layer 50 is disposed on the peripheral region B" of the substrate 20. In some embodiments, the wiring layer 50 is electrically connected to a flexible circuit board (not shown). A first decorative layer 55 is corresponding to the peripheral region B" of the substrate 20, and covers the wiring layer 50. A transparent adhesive layer 60 is disposed on the touch sensing layer 30 and the first decorative layer 55. The transparent adhesive layer 60 may be a material such as, but not limited to, optical clear adhesive (OCA), or the like. In an embodiment, the transparent adhesive layer 60 can only be disposed on the first decorative layer 55. A cover substrate 80 is disposed on the transparent adhesive layer 60, wherein a second decorative layer 75 is disposed between the cover substrate 80 and the transparent adhesive layer 60 and corresponding to the peripheral region B". The substrate 20 and the cover substrate 80 may be any light penetrating material, such as, but not limited to, a glass material, or a PET thin film.

Figure 3:
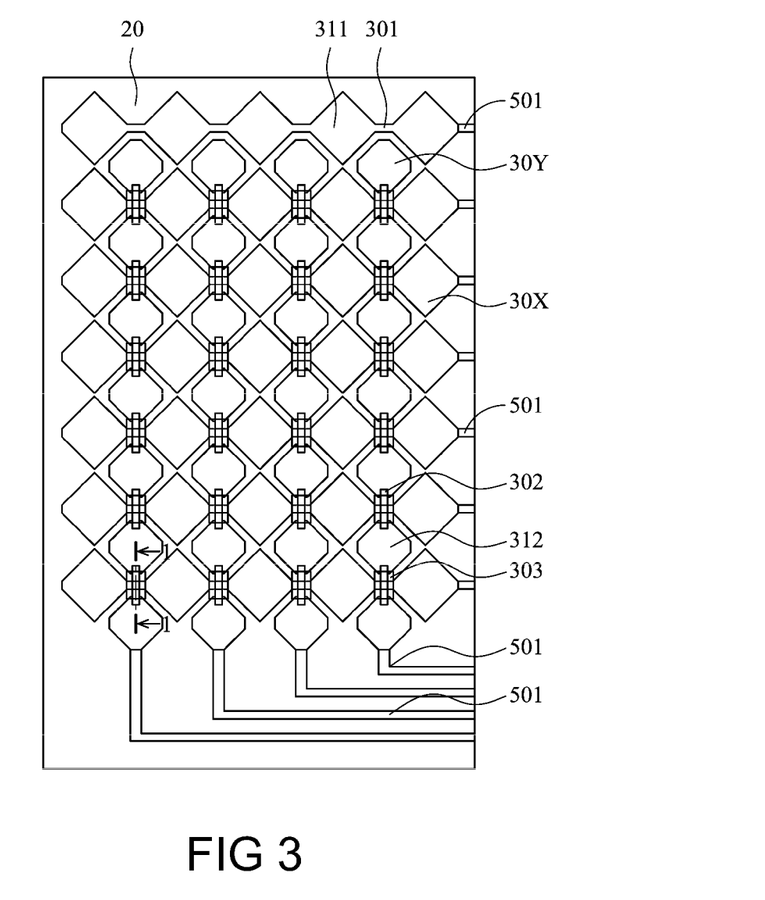
FIG. 3 illustrates the touch sensing layer and the wiring layer of a touch panel in accordance with another embodiment of the present disclosure.

As shown in FIG. 3, in an alternate embodiment, the touch sensing layer 30 includes a plurality of first axial sensing electrodes 30X and a plurality of second axial sensing electrodes 30Y. The first axial sensing electrodes 30X and second axial sensing electrodes 30Y are insulated from each other. Each first axial sensing electrode 30X includes a plurality of first electrode blocks 311 and a plurality of connecting wires 301 and every two adjacent first electrode blocks 311 are connected to each other via the connecting wire 301. Each second axial sensing electrode 30Y includes a plurality of second electrode blocks 312 and a plurality of crossing wires 302, and every two adjacent second electrode blocks 312 are connected to each other via the crossing wire 302. An insulating layer 303 is disposed between the connecting wire 301 and the crossing wire 302, the first axial sensing electrodes 30X and the second axial sensing electrodes 30Y can be insulated from each other by the use of the insulting layer 303. Note that the pattern of the touch sensing layer is not limited to the arrangement shown in FIG. 3. To the contrary, it is intended to cover various modifications and similar arrangements. For example, the touch sensing layer may be a pattern of single layer single axis or double layer double axis. The touch sensing layer can be formed of any transparent electrode material, such as, but not limited to, indium tin oxide (ITO), indium zinc oxide (IZO), indium gallium oxide, indium gallium zinc oxide (IGZO), silver nanowire, carbon nanotube, graphene, or the like. The wiring layer 50 comprises a plurality of wirings 501, and the wirings 501 are electrically connected to the sensing electrodes in each axial respectively.

In an embodiment, the material of the first decorative layer 55 may be a colored ink or a colored photoresist.

In an embodiment, the material of the second decorative layer 75 may be identical to or different from that of the first decorative layer 55.

The touch panel of the present disclosure is distinct from a conventional touch panel. As shown in FIG. 2, by disposing an additional decorative layer (first decorative layer 55) at the peripheral region B" between the wiring layer 50 and the transparent adhesive layer 60, a masking function can be achieved, without extending the second decorative layer 75 by a distance D (FIG. 1A), when users look at the touch panel 1000 from an inclined angle. By using the touch panel structure of the present disclosure, the width of the non-visible region formed by the first decorative layer 55 and the second decorative layer 75 is only Z". In other words, the width of the frame is Z". Therefore, in comparison with a conventional touch panel, the frame of the touch panel of the present disclosure is thinner, which provides a larger visible region, and further, increases the range of the touching area for users.

Figure 4A:
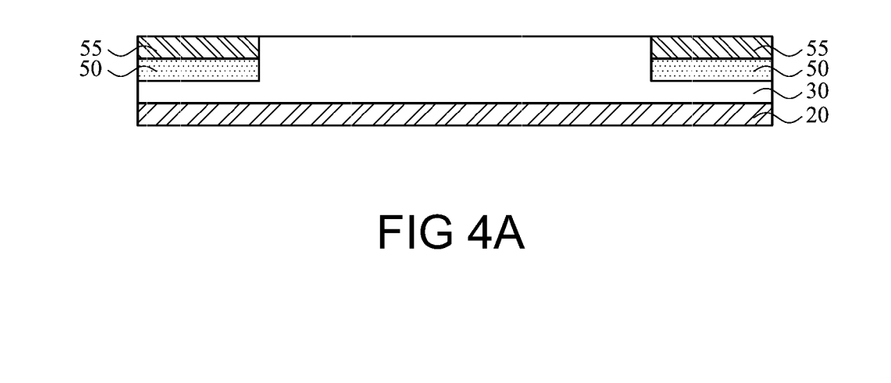
FIGS. 4A-4C illustrates the method of forming a touch panel in accordance with another embodiment of the present disclosure.
Figure 4B:
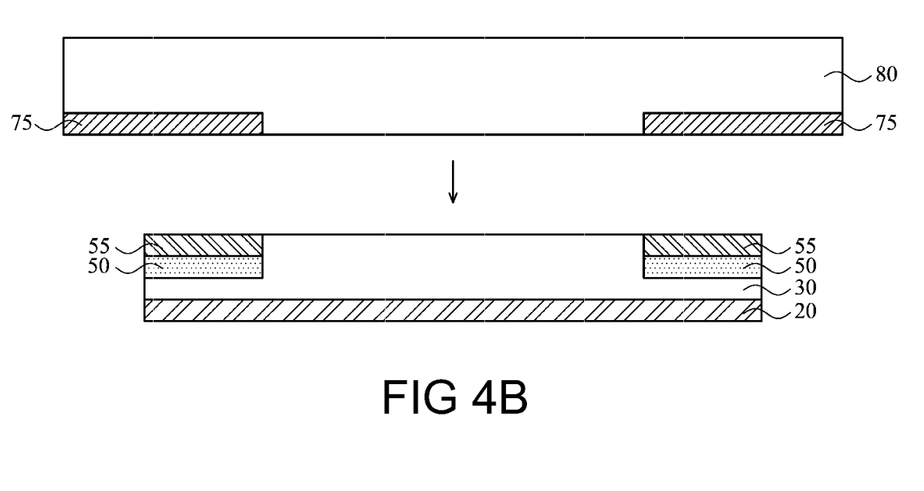
Figure 4C:
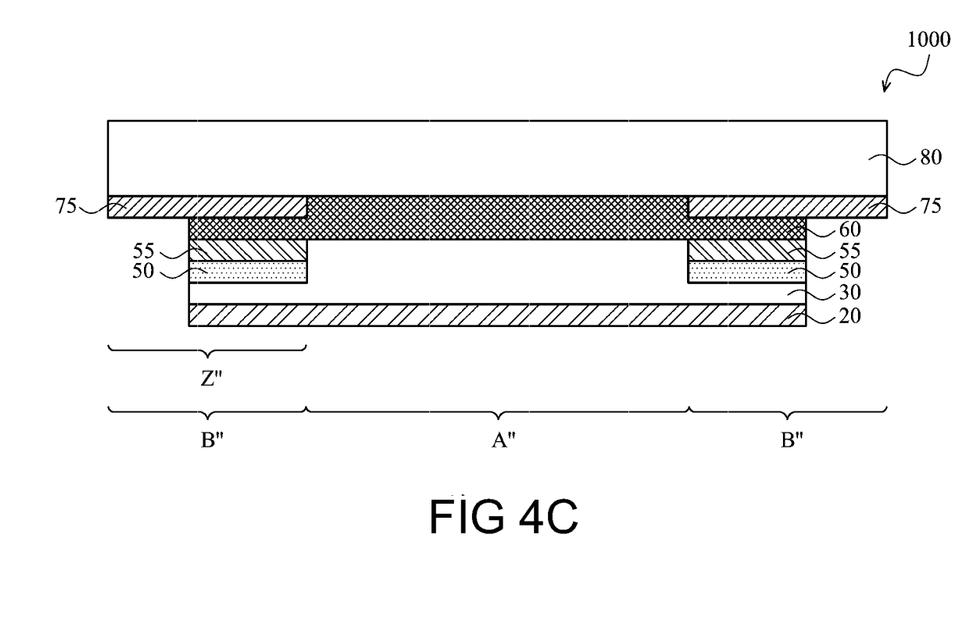

FIGS. 4A-4C illustrate a method of forming a touch panel 1000 in accordance with various embodiments of the present disclosure. The method of forming the touch panel 1000 will be described in accordance with FIGS. 4A-4C hereinafter. The components used in the embodiments herein are the same as the components mentioned above and will not be discussed again. Firstly, preparing a substrate 20. Secondly, referring to FIG. 4A, forming a touch sensing layer 30 on the substrate 20, and then forming a wiring layer 50 is on the peripheral region of the substrate 20, wherein the wiring layer 50 and the touch sensing layer 30 are electrically connected to each other. Then, forming a first decorative layer 55 on the wiring layer 50. The touch sensing layer 30 may include any known touch sensing layer structure. In some embodiments, the wiring layer 50 may electrically connect to a flexible printing circuit board (not shown). The first decorative layer 55 may be formed by a printing process. In some embodiments, the first decorative layer 55 may be colored ink or a colored photoresist.

Referring to FIGS. 4B-4C, once the touch sensing layer 30, the wiring layer and the first decorative layer 55 are formed, the formation of the touch panel 1000 is then completed by attaching the cover substrate 80 to the touch sensing layer 30 and the first decorative layer 55 by a transparent adhesive layer 60. In an alternate embodiment, the transparent adhesive layer 60 is attached only to the first decorative layer 55. The transparent adhesive layer 60 may include any transparent material which provides a stable adhesive between the substrate 20 and the cover substrate 80. For example, the transparent adhesive layer 60 may include, but not limited to, optical clear adhesive (OCA), or the like. Furthermore, a second decorative layer 75 is formed prior to the attaching, on a side of the cover substrate 80 where the transparent adhesive layer 65 attached to, and corresponds to the peripheral region B". The second decorative layer 75 is formed between the cover substrate 80 and the transparent adhesive layer 60. The second decorative layer 75 may be formed of the materials identical to that of the first decorative layer 55 as discussed above, but the first and second decorative layers may also be formed of different materials. The second decorative layer 75 may be formed by the same methods as for forming the first decorative layer 55, such as a printing process. The substrate 20 and cover substrate 80 may be any light penetrating material, such as a glass material, or PET thin film.

The touch panel of the present disclosure can be widely used in various electronic devices; especially in a display device, such as a liquid crystal display (LCD) device or an organic light-emitting diode display device. For example, the touch sensing layer discussed above may be formed on the surface of an LCD panel or an organic light-emitting diode panel to integrate the touch panel into an LCD device or an organic light-emitting diode display device.

It can prevent the wiring layer from being seen by users at an inclined angle from the top of the touch panel by using the techniques of the present disclosure. Further, the frame width may be reduced to meet the demands for thin-framed touch panels.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of manufacturing a touch panel, comprising:
    forming a touch sensing layer on a substrate having a central region and a peripheral region;
    forming a wiring layer on the peripheral region of the substrate, wherein:
        the wiring layer is electrically connected to the touch sensing layer, and
        the wiring layer has a top surface, a bottom surface, an inward facing side surface, and an outward facing side surface;
    forming a first decorative layer on the peripheral region of the substrate and covering the wiring layer, wherein:
        the first decorative layer has a top surface, a bottom surface, an inward facing side surface, and an outward facing side surface, and
        forming the first decorative layer comprises:
            forming the first decorative layer such that the inward facing side surface of the first decorative layer and the inward facing side surface of the wiring layer are in direct contact with an outward facing sidewall of the touch sensing layer in the central region of the substrate; and
    attaching a cover substrate and a second decorative layer to the first decorative layer by a transparent adhesive layer, wherein the second decorative layer is between the cover substrate and the transparent adhesive layer, overlies the wiring layer, and corresponds to the peripheral region.

2. The method of claim 1, wherein forming the first decorative layer comprises printing the first decorative layer on the top surface of the wiring layer.

3. The method of claim 1, comprising:
    printing the second decorative layer on a surface of the cover substrate prior to attaching the cover substrate to the first decorative layer.

4. The method of claim 1, wherein the first decorative layer comprises a material composition that is different than a material composition of the second decorative layer.

5. The method of claim 1, wherein the first decorative layer is formed directly on the top surface of the wiring layer.

6. The method of claim 1, wherein the cover substrate is attached to the first decorative layer such that the transparent adhesive layer is disposed between the top surface of the first decorative layer and a bottom surface of the second decorative layer to separate the top surface of the first decorative layer from the bottom surface of the second decorative layer.

7. The method of claim 1, wherein the cover substrate is attached to the first decorative layer such that the transparent adhesive layer directly contacts the top surface of the first decorative layer and a bottom surface of the second decorative layer.

8. The method of claim 1, wherein the transparent adhesive layer is in contact with the touch sensing layer.

9. The method of claim 1, wherein:
    forming the first decorative layer comprises forming the first decorative layer to have a first width, and
    the method comprises forming the second decorative layer to have a second width greater than the first width.

10. The method of claim 1, wherein:
    the second decorative layer has a top surface, a bottom surface, an inward facing side surface, and an outward facing side surface, and
    the method comprises:
        forming the second decorative layer such that after the cover substrate is attached to the first decorative layer, the inward facing side surface of the first decorative layer and the inward facing side surface of the second decorative layer are co-planar.

11. The method of claim 1, wherein the first decorative layer and the second decorative layer have a same material composition.

12. A method of manufacturing a touch panel, comprising:
    forming a touch sensing layer on a substrate having a central region and a peripheral region;
    forming a wiring layer on the peripheral region of the substrate, wherein:
        the wiring layer has a top surface, a bottom surface, an inward facing side surface, and an outward facing side surface, and
        the wiring layer is electrically connected to the touch sensing layer;
    forming a first decorative layer on the peripheral region of the substrate and covering the top surface of the wiring layer, wherein:
        the first decorative layer has a top surface, a bottom surface, an inward facing side surface, and an outward facing side surface, and
        forming the first decorative layer comprises:
            forming the first decorative layer such that the inward facing side surface of the first decorative layer and the inward facing side surface of the wiring layer are in direct contact with an outward facing sidewall of the touch sensing layer in the central region of the substrate; and
    attaching a cover substrate and a second decorative layer to the first decorative layer by a transparent adhesive layer, wherein:
        the second decorative layer is between the cover substrate and the first decorative layer, and
        the second decorative layer is on the peripheral region of the substrate.

13. The method of claim 12, wherein the cover substrate is attached to the first decorative layer such that the transparent adhesive layer directly contacts the top surface of the first decorative layer and a bottom surface of the second decorative layer.

14. The method of claim 12, comprising:
    printing the second decorative layer on a surface of the cover substrate prior to attaching the cover substrate to the first decorative layer.

15. The method of claim 12, wherein:
    the second decorative layer has a top surface, a bottom surface, an inward facing side surface, and an outward facing side surface, and forming the second decorative layer comprises forming the second decorative layer such that the inward facing side surface of the first decorative layer and the inward facing side surface of the second decorative layer are co-planar.

16. The method of claim 15, wherein forming the first decorative layer comprises forming the first decorative layer such that the inward facing side surface of the wiring layer and the inward facing side surface of the first decorative layer are co-planar.

17. A method of manufacturing a touch panel, comprising:
- forming a touch sensing layer on a substrate having a central region and a peripheral region, wherein a first portion of the touch sensing layer on the central region of the substrate has a first height and a second portion of the touch sensing layer on the peripheral region of the substrate has a second height less than the first height;
- forming a wiring layer on the peripheral region of the substrate, wherein the wiring layer is electrically connected to the touch sensing layer;
- forming a first decorative layer on the peripheral region of the substrate and covering a top surface of the wiring layer; and
- attaching a cover substrate and a second decorative layer to the first decorative layer by using a transparent adhesive layer formed between the first decorative layer and the second decorative layer to space apart a top surface of the first decorative layer and a bottom surface of the second decorative layer, wherein:
  - the second decorative layer is between the cover substrate and the transparent adhesive layer, and
  - the second decorative layer is on the peripheral region of the substrate.

18. The method of claim 17, wherein:
- the wiring layer has the top surface, a bottom surface, an inward facing side surface, and an outward facing side surface,
- the first decorative layer has the top surface, a bottom surface, an inward facing side surface, and an outward facing side surface, and
- forming the first decorative layer comprises:
  - forming the first decorative layer such that the inward facing side surface of the first decorative layer and the inward facing side surface of the wiring layer are in direct contact with an outward facing sidewall of the central region of the touch sensing layer.

19. The method of claim 17, wherein the first decorative layer comprises a material composition that is different than a material composition of the second decorative layer.

20. The method of claim 17, wherein a top surface of the touch sensing layer is co-planar with the top surface of the first decorative layer.

* * * * *